United States Patent [19]

John

[11] 3,771,551
[45] Nov. 13, 1973

[54] VALVE WITH POWDER CHARGE EMERGENCY OPERATOR

[75] Inventor: John S. John, Houston, Tex.

[73] Assignee: ACF Industries, Incorporated, New York, N.Y.

[22] Filed: Jan. 10, 1972

[21] Appl. No.: 216,639

[52] U.S. Cl.................. 137/486, 137/485, 251/11, 251/14, 251/58
[51] Int. Cl..................... F16k 31/143, F16k 17/32
[58] Field of Search...................... 137/67, 68, 456, 137/459, 460, 461, 485, 486; 251/63.6, 11

[56] References Cited
UNITED STATES PATENTS

| 2,082,940 | 6/1937 | Brisbane et al. | 251/250 X |
| 3,378,224 | 4/1968 | Boyle | 251/63.6 X |
| 3,407,843 | 10/1968 | Dandridge | 137/460 X |

OTHER PUBLICATIONS

"Explosive Actuated Valves" by M. W. Connell, Conax Corp., Buffalo, N.Y.; Published Sept. 24, 1956.

Primary Examiner—Martin P. Schwadron
Assistant Examiner—Richard Gerard
Attorney—Eugene N. Riddle

[57] ABSTRACT

A valve actuator having a cylinder and a piston is connected to a gas generating device for closing the valve in an emergency. A gas generating powder charge in the device is ignited by a firing pin or a hot filament released or energized by a circuit including a switch which closes in response to a given condition, such as an abnormal fluid pressure or rate of flow through the valve, whereupon the generated gas moves the piston to close the valve.

7 Claims, 3 Drawing Figures

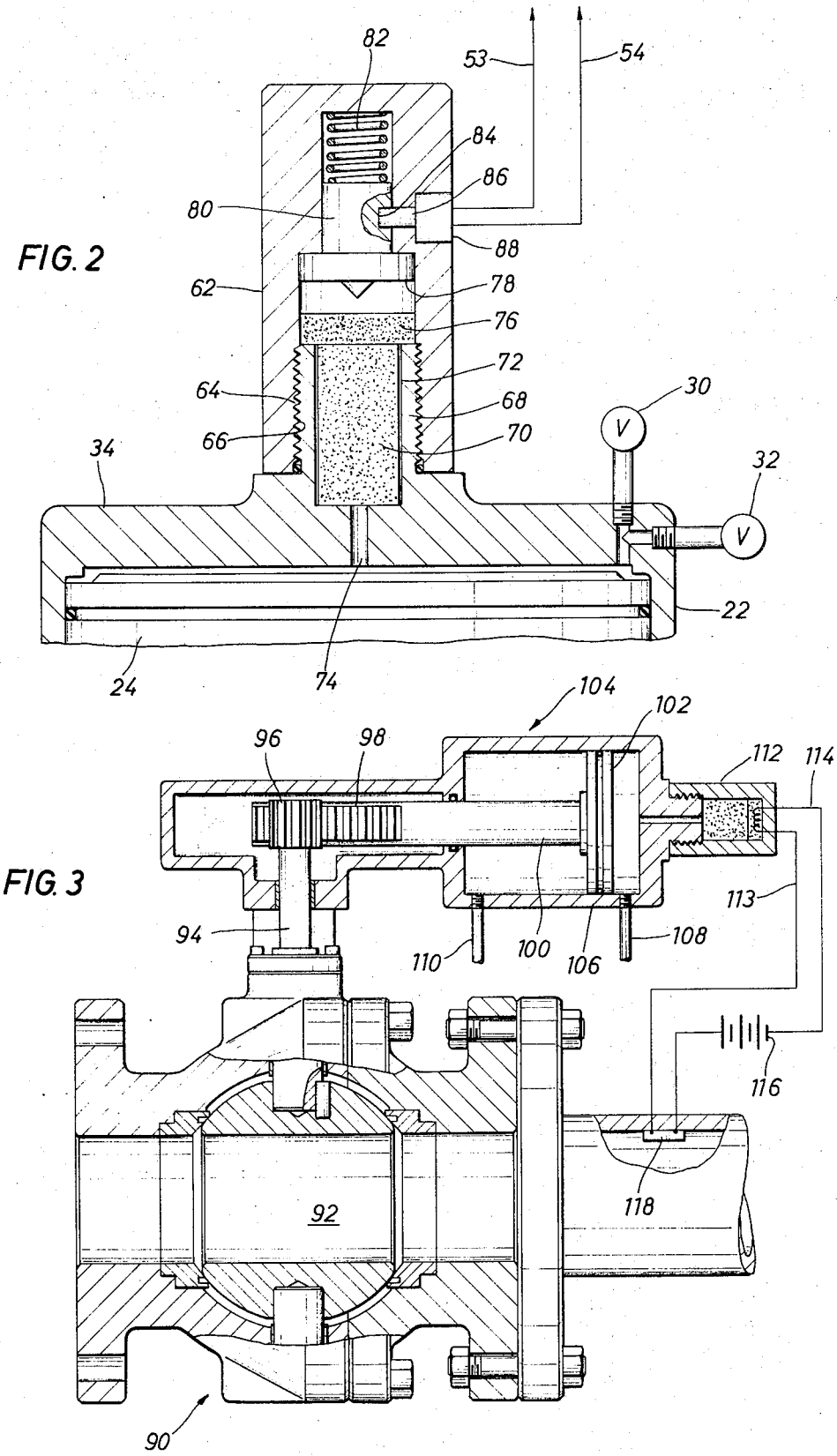

VALVE WITH POWDER CHARGE EMERGENCY OPERATOR

BACKGROUND OF THE INVENTION

Valves are used in many places where it is desirable quickly to shut off the valve if an abnormal condition occurs. For example, valve shutdown may be desirable in response to an abnormal flow or pressure at a valve connected to an oil or gas well, or pipeline. Such valves may be at remote or inaccessible locations, such as underwater. Therefore, automatic operation of the valve in response to an abnormal condition is desirable. It is an object of this invention to provide simple, reliable apparatus for this purpose.

SUMMARY OF THE INVENTION

In one embodiment, the invention is applied to a gate valve having a fluid pressure actuator mounted on the valve body and connected to the valve stem. A housing is mounted on the actuator cylinder and communicates with a passage to the interior of the cylinder. The housing contains a powder charge capable of producing a large amount of gas when fired or exploded. The powder charge preferably includes a starting or ignition charge which is readily ignited or fired and a main power charge which generates the bulk of the gas. A suitable igniting device, such as a heatable filament, is embedded in the ignition charge. The ignition device is energized by a circuit including a switch in a pipe connected to the valve and adapted to close in response to an abnormal pressure or rate of flow through the pipe.

In an alernative arrangement, the ignition charge is fired by a spring propelled firing pin which is released by a solenoid energized by the circuit mentioned above.

In another embodiment, the actuator piston is connected by a rack and pinion to a rotatable valve, such as a ball valve. When the piston is actuated by the gas generated by the powder charge, upon the occurrence of an abnormal condition, the valve is rotated by the rack and pinion to its closed position.

BRIEF DESCRIPTION OF THE DRAWING

FIG. 2 is a section of modified powder charge emergency closing means in which the gas generating charge is ignited by a firing pin for closing a gate valve.

FIG. 3 is a schematic view of the invention applied to a rotatable valve.

DESCRIPTION OF THE PREFERRED EMBODIMENTS

Figure 1:
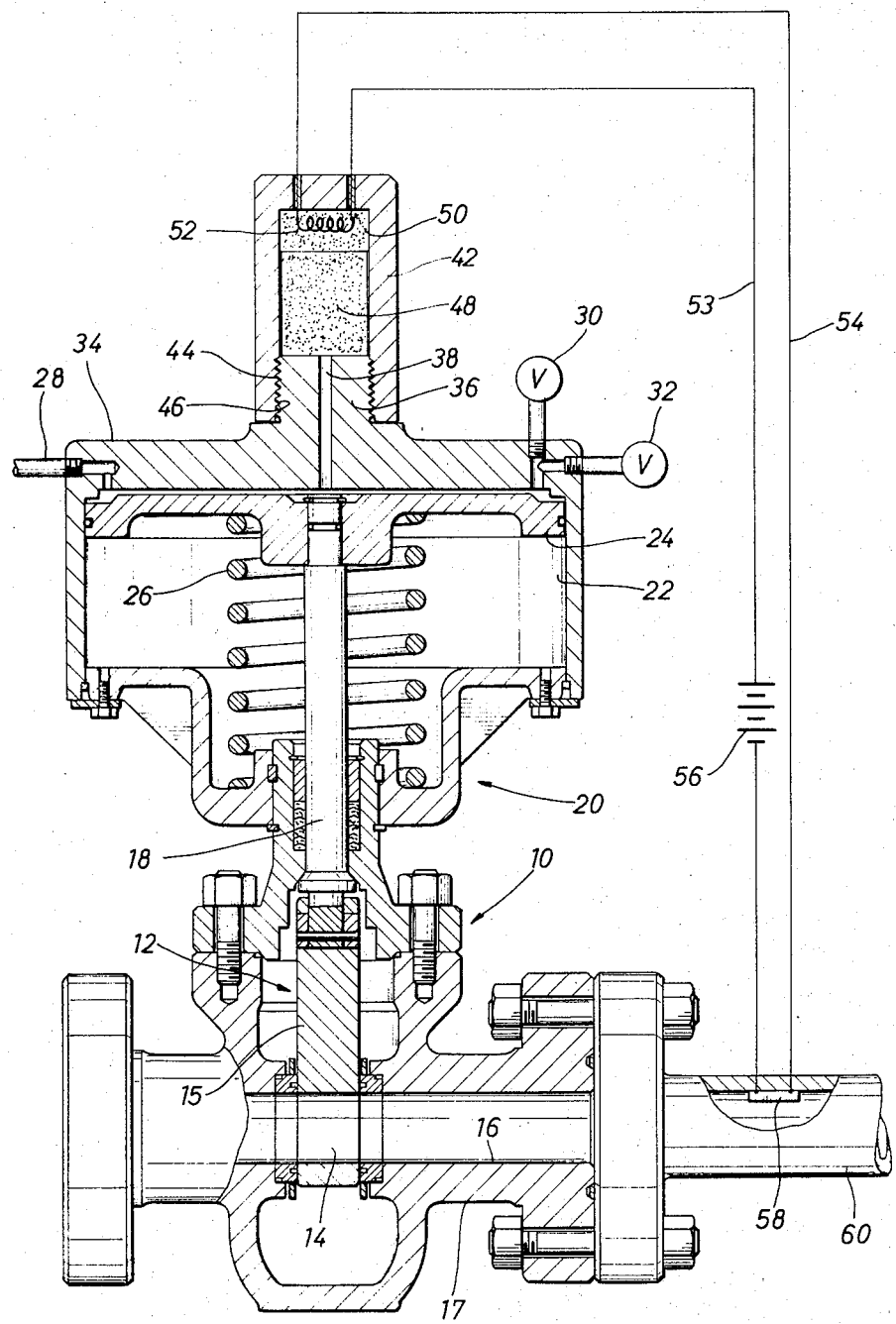
FIG. 1 is a schematic view of the invention, partly in section, in which a gas generating charge is ignited by an electrical filament for closing a gate valve.

Referring to FIG. 1, gate valve structure generally indicated 10 has a gate valve 12 provided with opening 14. Slab portion 15 of gate 12 is adapted to block flow through conduit 16 in valve body 17. Gate valve 12 is connected to stem 18, which extends into actuator 20. The latter includes cylinder 22, piston 24, and spring 26, which urges gate 12 upward to its open position. Pneumatic pressure may be supplied to cylinder 22 through inlet 28 to close the valve. The above described actuator is merely an example of one type that might be used, it being apparent that various other types may just as well be used. Cylinder 22 is preferably provided with a safety relief valve 30, and bleed off valve 32.

Top plate 34 of cylinder 22 has a threaded nipple or projection 36 with a bore 38 communicating with the interior of cylinder 22. A cap or housing 42 has threads 44 engaging threads 46 of nipple 36. Gas generating powder charge 48 and an easily ignitable powder charge 50 are enclosed in cap 42. Adjacent or embedded in charge 50 is heatable filament 52 connected by lines 53, 54 in circuit with current source 56 and sensing switch means 58. The latter is located in pipe 60 at any suitable place, such as slightly downstream thereof. Switch 58 is responsive to a dangerous or undesirable condition, which may be manifested by an abnormal rise or drop in pressure or an abnormal flow rate, particularly in gas or oil pipelines. Switch means 58 may consist of several units responsive to several abnormal possibly dangerous conditions.

Gas generating powder charges capable of producing a large amount of gas are well known. One widely used powder charge having this characteristic is that known as fusee. Other powder charges of this type are disclosed in U.S. Pat. Nos. 2,979,896; 2,985,104; and 3,033,216.

The emergency valve closing means of FIG. 2 includes housing 62 having threads 64 for engaging threads 66 of nipple 68. Powder charge 70 is in a bore 72 of the nipple above a central opening 74 in top plate 34 of cylinder 22. Ignition charge 76 is located immediately below a firing pin 78 having a stem 80 engaging a compressed spring 82. Stem 80 has an indentation 84 for receiving a spring pressed pin 86. Solenoid 88 is adapted to retract pin 86, when the circuit including lines 53, 54 is closed, for releasing the firing pin 78 so that it will be propelled by spring 82 to fire ignition charges 76 which, in turn, fires main powder charge 70.

The operation of the invention is apparent from the above description. When a given abnormal condition causes switch means 58 to close, filament 52 or solenoid 88 is energized. In the first case, filament 52 heats up and ignites powder charge 50 and causes the ignition of the main gas generating charge 48. The latter creates a large amount of gas, which passes through bore 38 into cylinder 22. The generated gas acts on piston 24 and depresses it to close valve 10. Excessive pressure will be released through valve 30. At any later time cylinder 22 may be bled through valve 32 to permit the valve to reopen. In the case of FIG. 2, energization of solenoid 88 and resultant release of the firing pin causes ignition, first of charge 76, and then main gas generating charge 70. Gas then passes through opening 74 into cylinder 22 to actuate piston 24 to close the valve.

While firing pin 78 has been shown as released by energizing of solenoid 88, in some instances it may be desirable to release the firing pin by manual means, such as a manually operated trigger. If a valve is employed in an undersea location, a diver might actuate a suitable manually operated trigger.

Referring to FIG. 3, valve 90 has a rotatable valve member 92 adapted to be turned by stem 94, at the upper end of which is pinion 96. The pinion is in mesh with a rack 98 connected by rod 100 to piston 102 of a pressure actuator 104, including cylinder 106 to which pressure may be normally applied through lines 108, 110. Emergency valve shutdown means 112 of the type shown in FIG. 1 or FIG. 2 is mounted on the end of cylinder 106 and is in communication therewith, in the manner disclosed in FIG. 1 or 2. A circuit of the type previously described is connected to emergency shutdown means 112, and includes lines 113, 114, current source 116, and condition sensing switch means 118. The operation is similar to that of the apparatus of FIGS. 1 and 2; namely, upon the occurrence of an abnormal condition, switch means 118 closes and causes unit 112 to fire and move piston 102. Rack 98 then moves to the left and turns gear 96 and stem 94 to rotate ball valve 92 to its closed position. It is to be understood that other means might be employed in combination with emergency shutdown means 112 to rotate a valve means, and FIG. 3 merely shows one possible arrangement.

What is claimed is:

1. In combination, a fluid valve and apparatus for causing selective emergency operation of the valve, comprising a valve body, a valve member in said valve body movable to an open or closed position, a fluid pressure actuator including a pressure container and a movable partition therein, means connecting said partition to the valve member for movement of the valve member to open or closed position, means in the actuator for holding the valve member in one of said positions under normal operation, fluid pressure means for moving said partition and valve to the other of said positions under normal operation, a combustible charge adapted to generate a large amount of gas when exploded, an enclosure for said gas generating charge connected to the pressure container of the actuator, and means for firing said gas generating charge providing gas to said pressure container to cause said actuator to move said valve member to the other of its said positions under emergency operation independently of said fluid pressure means, said means for firing said gas generating charge being responsive to a predetermined condition of the fluid passing through the valve and effecting movement of the valve member upon the fluid reaching said predetermined condition.

2. Apparatus according to claim 1, wherein said means for firing the charge includes an electrical circuit having a heatable filament in said enclosure and switch means for closing said circuit in response to a predetermined condition of the fluid passing through the valve.

3. Apparatus according to claim 2, wherein said switch means is adapted to close in response to a predetermined fluid pressure condition in a fluid line connected to the valve.

4. Apparatus according to claim 2, wherein said switch means is adapted to close in response to a predetermined flow condition in a fluid line connected to the valve.

5. Apparatus according to claim 1 having a rotary valve member, said actuator including means for converting a linear movement of said movable partition to a rotary motion.

6. Apparatus according to claim 1, wherein said means for firing said charge includes a firing pin in said enclosure adapted to be actuated to impact said charge.

7. In combination, a fluid valve structure and apparatus for causing selective emergency closing thereof comprising a valve body, a gate valve in said valve body movable between open and closed positions, a fluid pressure cylinder connected to said valve body and having a piston therein, means connecting the piston to the gate valve for movement of the gate valve between open and closed positions, means for holding the gate valve in its open position under normal operation, fluid pressure means for moving said piston and gate valve to the closed position of the gate valve under normal operation, a combustible charge mounted adjacent the fluid pressure cylinder and adapted to generate a large amount of gas when exploded, an enclosure for said gas generating charge connected to the fluid pressure cylinder, and means for firing the gas generating charge providing gas to the cylinder for moving the piston to the closed position of the gate valve under emergency operation independently of said fluid pressure means, said means for firing said gas generating charge being responsive to a predetermined condition of the fluid passing through the valve structure and effecting closing of the gate valve upon the fluid reaching said predetermined condition.

* * * * *